(12) United States Patent
Döring et al.

(10) Patent No.: US 7,984,609 B2
(45) Date of Patent: Jul. 26, 2011

(54) EXHAUST GAS POST TREATMENT SYSTEM

(75) Inventors: Andreas Döring, München (DE); Klaus Richter, Steyr (AT)

(73) Assignee: MAN Truck & Bus AG (DE)

( * ) Notice: Subject to any disclaimer, the term of this patent is extended or adjusted under 35 U.S.C. 154(b) by 1013 days.

(21) Appl. No.: 11/839,730

(22) Filed: Aug. 16, 2007

(65) Prior Publication Data
US 2008/0041052 A1 Feb. 21, 2008

(30) Foreign Application Priority Data
Aug. 16, 2006 (DE) .................. 10 2006 038 291

(51) Int. Cl.
*F01N 3/00* (2006.01)
(52) U.S. Cl. ............... 60/286; 60/287; 60/282; 60/295; 60/284
(58) Field of Classification Search .............. 60/273, 60/274, 280, 281, 284–288, 291, 295, 299–301, 60/305
See application file for complete search history.

(56) References Cited

U.S. PATENT DOCUMENTS

| | | | | |
|---|---|---|---|---|
| 3,889,464 A * | 6/1975 | Gardner | ............. | 60/286 |
| 5,406,790 A * | 4/1995 | Hirota et al. | ............. | 60/276 |
| 6,691,509 B2 * | 2/2004 | Hoffman et al. | ............. | 60/286 |
| 6,718,757 B2 * | 4/2004 | Khair et al. | ............. | 60/286 |
| 6,742,328 B2 * | 6/2004 | Webb et al. | ............. | 60/285 |
| 6,820,414 B2 * | 11/2004 | Stroia et al. | ............. | 60/286 |
| 6,823,660 B2 * | 11/2004 | Minami | ............. | 60/280 |
| 6,843,966 B1 * | 1/2005 | Mahr | ............. | 422/172 |
| 6,892,529 B2 * | 5/2005 | Duvinage et al. | ............. | 60/286 |
| 7,177,667 B2 * | 2/2007 | Kim | ............. | 455/561 |
| 7,485,273 B2 * | 2/2009 | Gandhi et al. | ............. | 423/213.2 |

(Continued)

FOREIGN PATENT DOCUMENTS
DE 103 48 492 5/2005
(Continued)

*Primary Examiner* — Thomas E Denion
*Assistant Examiner* — Jesse Bogue
(74) *Attorney, Agent, or Firm* — Robert W. Becker; Robert Becker & Assoc.

(57) ABSTRACT

An exhaust gas post treatment system for nitrogen oxide and particle reduction of internal combustion engines operated with excess air. An oxidation catalytic converter is disposed in the exhaust gas stream of the engine for converting at least a portion of the nitric oxide in the exhaust gas into nitrogen dioxide. The first particle separator or filter is disposed in the exhaust gas stream downstream of the oxidation catalytic converter for converting carbon particles accumulated in the separator or filter into carbon monoxide, carbon dioxide, nitrogen and nitric oxide with the aid of nitrogen dioxide contained in the exhaust gas. A partial exhaust gas stream is branched off from the exhaust gas stream upstream of the first separator or filter. A metering device adds reduction agent to the partial exhaust gas stream in the form of ammonia or a material that releases ammonia downstream of the supply location due to hot exhaust gas. A second particle separator or filter is disposed in the partial exhaust gas stream downstream of the supply location. The partial exhaust gas stream returns to the exhaust gas stream downstream of both particle separators or filters. An SCR catalytic converter is disposed downstream of the return location for reducing nitrogen oxides in the exhaust gas to nitrogen and water vapor with the aid of ammonia or released ammonia by way of selective catalytic reduction.

25 Claims, 2 Drawing Sheets

U.S. PATENT DOCUMENTS

| | | | |
|---|---|---|---|
| 7,614,214 B2 * | 11/2009 | Yan | 60/286 |
| 7,661,265 B2 * | 2/2010 | Baumgartner | 60/286 |
| 7,810,316 B2 * | 10/2010 | Salemme et al. | 60/288 |
| 2005/0069476 A1 * | 3/2005 | Blakeman et al. | 423/239.1 |
| 2006/0010859 A1 * | 1/2006 | Yan et al. | 60/286 |
| 2006/0059896 A1 | 3/2006 | Liu et al. | |
| 2006/0153761 A1 * | 7/2006 | Bandl-Konrad et al. | 423/239.1 |
| 2008/0041040 A1 | 2/2008 | During | |

FOREIGN PATENT DOCUMENTS

| | | |
|---|---|---|
| EP | 0 341 832 | 11/1989 |
| EP | 1 054 722 | 5/2001 |
| EP | 1 357 267 | 10/2003 |
| WO | WO 2006/029201 | 3/2006 |

* cited by examiner

EXHAUST GAS POST TREATMENT SYSTEM

The instant application should be granted the priority date of Aug. 16, 2006 the filing date of the corresponding German patent application 10 2006 038 291.9.

BACKGROUND OF THE INVENTION

The present invention relates to an exhaust gas post treatment system for internal combustion engines, such as diesel engines and gasoline engines having direct injection, that are operated with excess air.

Limited exhaust gas components, which result during combustion processes and the permissible emissions of which are continuously being lowered, include, in addition to solid particles, nitrogen oxides. To minimize these exhaust gas components with internal combustion engines operated in motor vehicles, various methods are presently used. The reduction of the nitrogen oxides generally occurs with the aid of catalysts, and in oxygen-rich exhaust gas a reduction agent is additionally required in order to increase the selectivity and $NO_x$ conversions. These methods have become know by the collective term SCR processes, whereby SCR stands for "Selective Catalytic Reduction". It has been used for many years in the power plant industry, and in recent times also with internal combustion engines. A detailed illustration of such processes can be found in DE 34 28 232 A1. $V_2O_5$-containing mixed oxides, for example in the form of $V_2O_5/WO_3/TiO_2$, can be used as SCR catalysts. Typical $V_2O_5$ proportions are between 0.2-3%. In practice ammonia, or compounds that release ammonia, such as urea or ammonium formate, in solid or dissolved form, are used as reduction agents. To convert one mol nitric oxide one mol ammonia is required.

$$4NO+4NH_3+O_2 \rightarrow 4N_2+6H_2O \quad (1)$$

If a platinum-containing NO-oxidation catalytic converter is disposed upstream of the SCR catalyst for the formation of $NO_2$, $$2NO+O_2 \leftrightarrows 2NO_2 \quad (2)$$

The SCR reaction can be considerably accelerated, and the low temperature activity can be significantly raised.

$$NO+2NH_3+NO_2 \rightarrow 2N_2+3H_2O \quad (3)$$

With internal combustion engines operated in vehicles the nitrogen oxide reduction with the aid of the SCR process is difficult for the reason that changing operating conditions exist that make the quantitative metering of the reduction agent difficult. Although on the one hand as high a conversion of the nitrogen oxides as possible should be achieved, on the other hand care must be taken that there is no emission of unused ammonia. To provide a remedial measure, an ammonia-blocking catalytic converter is frequently disposed downstream of the SCR catalyst to convert excess ammonia into nitrogen and water vapor. The use of $V_2O_5$ as active material for the SCR catalyst can also pose a problem if the exhaust gas temperature at the SCR catalyst is greater than 650° C., because $V_2O_5$ then sublimates. For this reason, iron or copper zeolites that are free of $V_2O_5$ are used for high temperature applications.

To minimize the very fine particles, not only in the power plant industry but also with vehicles, either so-called particle separators or particle filters are used. A typical arrangement having particle separators for use in vehicles is described, for example, in EP 1 072 765 A1. Such arrangements differ from those having particle filters in that the diameter of the channels of the particle separator are considerably greater than the diameter of the largest particle that is present, whereas with particle filters the diameter of the filter channels is in the range of the diameter of the particles. As a consequence of this difference, particle filters are subject to becoming clogged, which increases the exhaust gas counter pressure and reduces the engine power. An arrangement and a method using particle filters can be found in EP 0 341 832 A2. The two aforementioned arrangements or methods are characterized in that the oxidation catalytic converter, which is respectively disposed upstream of the particle separator or particle filter, and which is generally a catalyst having platinum as the active material, oxidizes the nitric oxide in the exhaust gas with the aid of the also-contained residual oxygen to nitrogen dioxide, which in turn is converted in the particle separator, or the particle filter, with the carbon particles to CO, $CO_2$, $N_2$, and NO. In this way, a continuous removal of the accumulated very fine particles is effected; expensive and/or complicated regeneration cycles, which must be carried out with other arrangements, are thereby eliminated.

$$2NO_2+C \rightarrow 2NO+CO_2 \quad (4)$$

$$2NO_2+C \rightarrow 2NO+CO \quad (5)$$

$$2C+2NO_2 \rightarrow N_2+2CO_2 \quad (6)$$

In order to fulfill the exhaust gas regulations that will be applicable in the future it is necessary to simultaneously use not only arrangements for reducing nitrogen oxide emissions, but also arrangements for reducing the emission of very fine particles. For this purpose, already various arrangements and methods have become known.

DE 103 48 799 A1 describes an arrangement that is comprised of an oxidation catalytic converter, an SCR catalyst disposed downstream thereof in the exhaust gas stream, and a particle filter that in turn is disposed downstream of the SOP catalyst in the exhaust gas stream. The supply of the reduction agent for the selective catalytic reaction that takes place in the SCR catalyst is effected immediately prior to the SCR catalyst via a urea injection device that is controlled as a function of operating parameters of the internal combustion engine. The drawback of this arrangement is that the nitrogen dioxide produced in the oxidation catalytic converter is essentially completely used up by the selective catalytic reduction in the SCR catalyst, in other words, is no longer available for the conversion of the very fine particles that have accumulated in the downstream particle filter. The regeneration of the particle filter must therefore be realized by an expensive and/or cyclical heating-up of the exhaust gas stream by enriching the exhaust gas stream with non-combusted hydrocarbons. This occurs either by enriching the combustion mixture or introducing fuel ahead of the particle filter. Such an arrangement for regenerating the particle filter is on the one hand complicated and hence expensive, and on the other hand the cyclical regeneration of the particle filter disposed at the end of the arrangement again produces harmful materials that can no longer be removed from the exhaust gas. In addition, if particle filters are used they can become clogged with oil ash, so that such filters must be removed at certain intervals and must be cleaned.

A further combination of a particle filter and an arrangement for the selective catalytic reduction is known from EP 1 054 722 A1. The arrangement described therein comprises an oxidation catalytic converter that is disposed in the exhaust gas stream and that increases the proportion of nitrogen dioxide in the exhaust gas, a fine material filter disposed downstream thereof, a reservoir for the reduction liquid, as well as an injection device for the reduction fluid that is disposed behind the fine material filter, and additionally an SCR catalytic converter disposed downstream in the exhaust gas stream. Although the above-described arrangement permits a continuous conversion of the fine material particles of the carbon type accumulated in the fine material filter with the aid of the nitrogen dioxide produced in the oxidation catalytic converter, it has another very serious drawback. The particle filter causes a cooling of the exhaust gas, so that for example with the use of the presently commercially available reduction liquid designated AdBlue, the exhaust gas temperature, in particular after startup of the internal combustion engine, or during operation of the internal combustion engine in a lower output range, is too low to produce ammonia without yielding problematic byproducts from the 33% aqueous urea solution.

In conjunction with the decomposition of urea $((NH_2)_2CO)$ into ammonia $(NH_3)$, it is known that this occurs under optimum conditions (temperatures greater than 350° C.) in two stages; according to $$(NH_2)_2CO \rightarrow NH_3 + HNCO \qquad (7)$$

there is first effected the thermolysis, or pyrolysis, i.e. the thermal decomposition of urea. Subsequently, according to $$HNCO + H_2O \rightarrow NH_3 + CO_2 \qquad (8)$$

there is effected the hydrolysis, in other words, the catalytic conversion of isocyanic acid (HNCO) into ammonia $(NH_3)$ and carbon dioxide $(CO_2)$.

Since with the use of AdBlue the reduction agent is present in a form dissolved in water, this water must be evaporated prior to and during the actual pyrolysis and hydrolysis.

If the temperature present with the previous reaction according to (7) and (8) is less than 350° C., or is heated only slowly, it is known from DE 40 38 054 A1 that essentially solid, non-meltable cyanuric acid results from trimerization of the isocyanic acid formed according to (7) pursuant to $$3HNCO \underset{\geq 350° C.}{\overset{<350° C. \rightarrow}{\rightleftarrows}} (HNCO)_3 \qquad (9)$$

which leads to clogging of the following SCR catalytic converter. Remedial action can, as outlined in the aforementioned DE 40 38 054, be provided by guiding the exhaust gas stream that is laden with the reduction agent over a hydrolysis catalytic converter. The exhaust gas temperature from which a quantitative hydrolysis is possible can thus be depressed to 160° C. The construction and composition of an appropriate catalytic converter is also described in the aforementioned publication as are the construction and function of an SCR catalytic converter system that is equipped with a hydrolysis catalytic converter.

Proceeding from the previously described state of the art, it is an object of the present invention, while avoiding the drawbacks of the known arrangements, to provide an exhaust gas post treatment system that reduces not only the particle emission but also the nitrogen oxide emission and that on the one hand operates without special regeneration cycles for the particle separator or particle filter and on the other hand, at possibly all operating conditions, releases $NH_3$ from the reduction agent without the formation of problematic reaction products.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
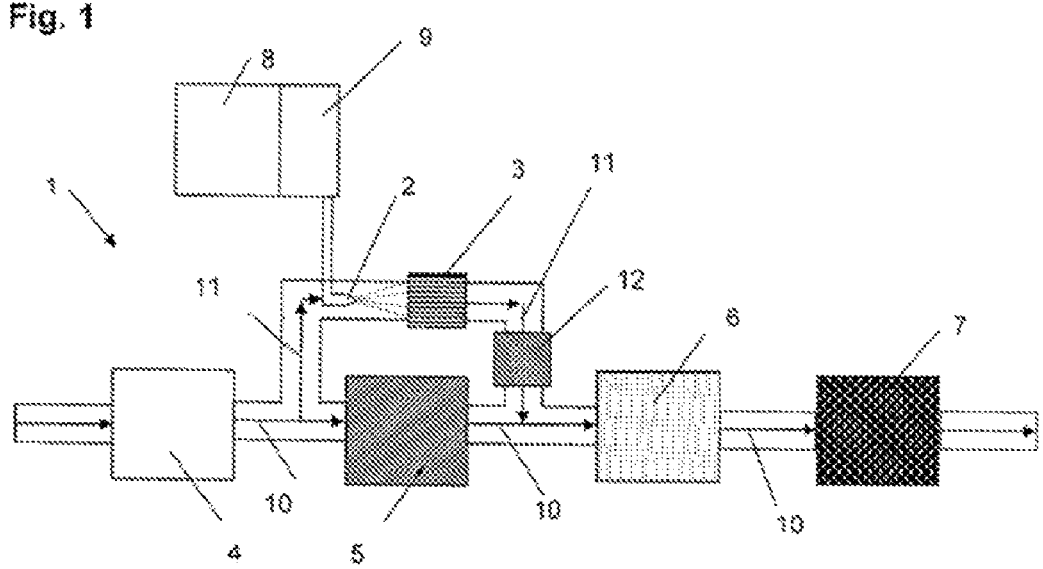
FIG. 1 shows a first exhaust gas post treatment system having partial stream hydrolysis.

Pursuant to the present application, an exhaust gas system is provided for nitrogen oxide and particle reduction of internal combustion engines operated with excess air, whereby the nitrogen oxide reduction is effected via an SCR catalytic converter and the particle reduction is effected via a particle separator or a particle filter, whereby disposed in the exhaust gas stream of the internal combustion engine is an oxidation catalytic converter that converts at least a portion of the nitric oxide contained in the exhaust gas stream into nitrogen dioxide, whereby disposed in the exhaust gas stream downstream of the oxidation catalytic converter is a first particle separator or particle filter that converts the carbon particles accumulated in the first particle separator or particle filter into carbon monoxide, carbon dioxide, nitrogen and nitric oxide with the aid of nitrogen dioxide contained in the exhaust gas stream, whereby a partial exhaust gas stream branches off from the exhaust gas stream upstream of the first particle separator or particle filter, whereby a supply tank for a reduction agent and a metering device for the reduction agent are provided, wherein the metering device adds the reduction agent to the partial exhaust gas stream, whereby the reduction agent is ammonia or a material that releases ammonia downstream of the supply location as a result of the hot exhaust gas, whereby a second particle separator or particle filter is disposed in the partial exhaust gas stream downstream of the supply location, whereby downstream of the second particle separator or particle filter, and downstream of the first particle separator or particle filter, the partial exhaust gas stream is returned to the exhaust gas stream, and whereby an SCR catalytic converter is disposed downstream of the return location for reducing the nitrogen oxides contained in the exhaust gas stream to nitrogen and water vapor with the aid of ammonia or released ammonia by way of selective catalytic reduction.

The realization of the object of the present application is based on achieving the required exhaust gas threshold values in that the nitrogen oxide reduction is effected by an SCR catalytic converter with the aid of ammonia, and the particle reduction is realized by means of a particle separator or a particle filter. The inventive exhaust gas post treatment system provides an oxidation catalytic converter in the exhaust gas stream of the internal combustion engine for converting at least a portion of the nitric oxide contained in the exhaust gas stream into nitrogen dioxide. Disposed downstream of the oxidation catalytic converter is a first particle separator or particle filter for converting the carbon particles accumulated in the first particle separator or particle filter into carbon monoxide, carbon dioxide, nitrogen and nitric oxide with the aid of the nitrogen dioxide contained in the exhaust gas stream. It was found that the effect of the first particle separator or particle filter can be advantageously optimized if a partial exhaust stream was branched off from the exhaust gas stream upstream of the first particle separator or particle filters and if a reduction agent, in the form of ammonia or a material that releases ammonia as a result of the hot exhaust gas, is added to this partial exhaust gas stream from a supply tank via a metering device, wherein the partial exhaust gas stream is then guided over a second particle separator or particle filter that is disposed downstream of the supply location of the reduction agent, with the partial exhaust gas stream then being returned to the exhaust gas stream downstream of the first particle separator or particle filter.

An SCR catalytic converter is disposed downstream of the return or combining location for reducing the nitric oxides contained in the exhaust gas stream to nitrogen and water vapor with the aid of ammonia or released ammonia by way of selective catalytic reduction. As a consequence of the inventive arrangement of the components of the system, particle conversion can advantageously be optimized in that the first particle separator or particle filter, without influence upon the effectiveness of the reduction agent, for example by being charged with a catalyst material, converts the nitric oxide into nitrogen dioxide. Similarly, the arrangement in the partial exhaust gas stream can be optimally, and hence advantageously, designed for the preparation of the reduction agent by realizing certain measures that facilitate the preparation of the reduction agent, such as the control or regulation of the volume stream or of the exhaust gas temperature in the partial exhaust gas stream.

To minimize the structural size and the cost of the exhaust gas post treatment system, there is advantageously also the possibility of combining the oxidation catalytic converter and the first particle separator or particle filter to form a single component in such a way that the first particle separator or particle filter is at least partially coated or impregnated with an active component that forms the oxidation catalytic converter.

To optimize the preparation of the reduction agent in the partial exhaust gas stream, a hydrolysis catalytic converter can be disposed downstream of the supply location for the reduction agent, and upstream of the second particle separator or particle filter, for advantageously improving the release of ammonia. In this connection, there is the advantageous possibility of combining the hydrolysis catalytic converter and the particle separator or particle filter in a single component such that the particle separator or particle filter is at least partially coated or impregnated with an active component that forms the hydrolysis catalytic converter.

The partial exhaust gas stream can already branch off from the exhaust gas stream upstream of the oxidation catalytic converter, a further oxidation catalytic converter is then to be disposed in the partial exhaust gas stream for converting at least a portion of the nitric oxide contained in the partial exhaust gas stream into nitrogen dioxide, with the further oxidation catalytic converter being adapted to the conditions in the partial exhaust gas stream with regard to active material and size. As a result, it is advantageously possible to achieve less of a cooling of the partial exhaust gas stream than would be possible in the exhaust gas stream itself.

With internal combustion engines that are supercharged by means of exhaust gas turbochargers, it can be advantageous for the partial exhaust gas stream, into which the reduction liquid is sprayed or otherwise introduced, to branch off upstream of the turbine of the exhaust gas turbocharger in order to provide as high a temperature as possible for the release of the ammonia. If the turbine is a double-flow turbine, whereby one channel is supplied with exhaust gas from at least one first cylinder, and the other channel is supplied with exhaust gas from at least one second cylinder, it is advantageous to branch the partial exhaust gas stream off from one of the two channels. The cylinders of the channel from which the partial exhaust gas stream branches off can be operated with other engine parameters than are the cylinders of the other channel, so that it is advantageously possible to optimize the conditions in the partial exhaust gas stream with regard to the preparation of the reduction agent by, for example, raising the exhaust gas temperature in the start-up phase or in the low load range.

If the internal combustion engine has two exhaust gas turbochargers, whereby the turbine of one of the turbochargers is supplied with exhaust gas from a first bank of cylinders of the internal combustion engine, and the turbine of the other turbocharger is supplied with exhaust gas from a second bank of cylinders of the internal combustion engine, it is advantageous if the partial exhaust gas stream branches off from the exhaust gas stream upstream of the turbine of one of the two exhaust gas turbochargers. The cylinders of the bank of cylinders, from the exhaust gas section of which the partial exhaust gas stream branches off, can then be operated with other engine parameters than are the cylinders of the other bank of cylinders, so that also here it is advantageously possible to optimize the conditions in the partial exhaust gas stream with regard to the preparation of the reduction agent by, for example, raising the exhaust gas temperature in the start-up phase or in the low load range.

For the exact metering of the reduction agent, it can furthermore be advantageous to dispose a flow-control element in the partial exhaust gas stream for controlling or regulating the volume velocity or the quantity of the exhaust gas therein.

In order with internal combustion engines installed in vehicles during pushing operation or in engine braking operation to prevent the partial exhaust gas stream that is already laden with ammonia from flowing back in the direction of the internal combustion engine, it is advantageous to dispose a check valve upstream of the supply location and in this way to protect the upstream components from the aggressive or corrosive ammonia. Alternatively, or in addition thereto, it can be advantageous to use a controllable shutoff element, for example in the form of an exhaust gas valve, in the partial exhaust gas stream, upstream of the supply location, that if there is a danger of backflow blocks the partial exhaust gas stream. Such a controllable valve could also advantageously serve as a controllable or regulatable element.

It can furthermore be advantageous to dispose a catalytic converter for the oxidation of ammonia downstream of the SCR catalytic converter to prevent ammonia slippage.

For the catalytic converter for the oxidation of NO to $NO_2$, as well as for the catalytic converter for the oxidation of ammonia, platinum and/or palladium and/or iridium and/or oxides thereof and/or $IrTiO_x$ and/or zeolites can advantageously be used as active material. The SCR catalytic converters for the reduction of nitrogen oxide with the aid of ammonia can advantageously contain vanadium and/or vanadium pentoxide and/or titanium dioxide and/or tungsten oxide and/or copper-containing zeolites and/or iron-containing zeolites and/or cobalt-containing zeolites as active components. Titanium dioxide and/or silicon dioxide and/or aluminum oxide and/or zeolites can be used as active components for the hydrolysis catalytic converter for the release of ammonia.

To optimize the conditions not only in exhaust gas stream but also in the partial exhaust gas stream, it can be advantageous to select different active components for the oxidation catalytic converter in the exhaust gas stream and for the active components of the further oxidation catalytic converter in the partial exhaust gas stream, wherein the active components are to be adapted to the subsequent chemical reactions.

Since the exhaust gas temperature at the particle separator or particle filter, as well as the content of nitrogen dioxide at the particle separator or the particle filter, significantly influence the effectiveness of the exhaust gas post treatment system, it can be advantageous to vary the exhaust gas temperature and/or the content of nitrogen dioxide by varying the engine setting by means of the already present engine control unit. In particular, the exhaust gas temperature and the nitrogen dioxide content can be raised by altering the engine parameters or by supplying hydrocarbons to the exhaust gas stream upstream of the oxidation catalytic converter for the oxidation of nitric oxide (and/or of hydrocarbons and/or of carbon monoxide).

Furthermore, it can be advantageous to combine a plurality of the catalytic converters contained in the exhaust gas post treatment system in a single housing in order to minimize the cost for the system and in particular to minimize the space required for installation in, for example, commercial vehicles. Particle separators or particle filters should advantageously be constructed in such a way that they can be exchanged or removed.

Further specific features and advantages of the present application will be described in detail subsequently.

DESCRIPTION OF SPECIFIC EMBODIMENTS

Figure 2:
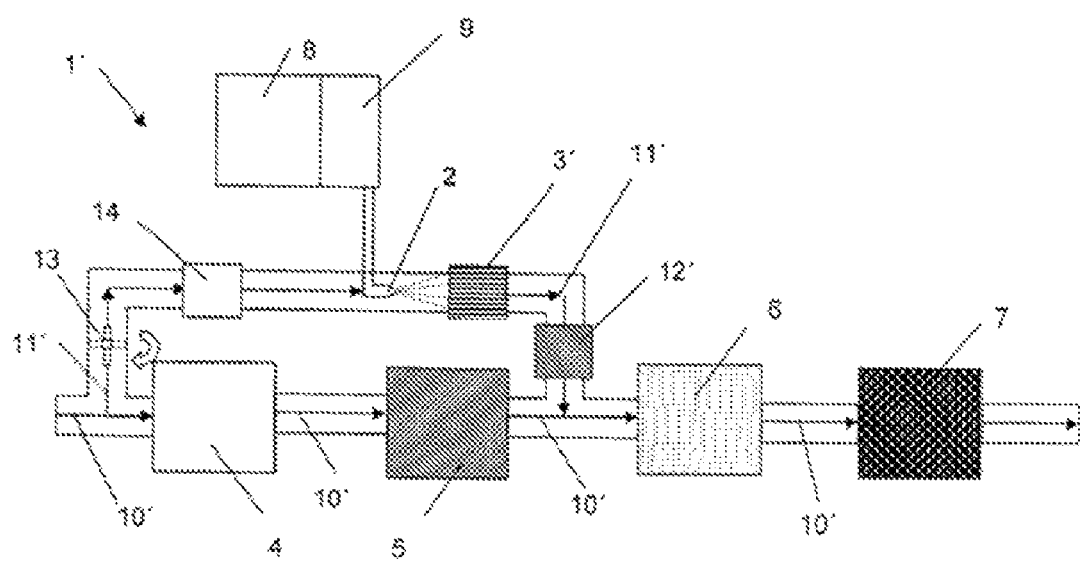
FIG. 2 shows a second exhaust gas post treatment system having partial stream hydrolysis.
Figure 3:
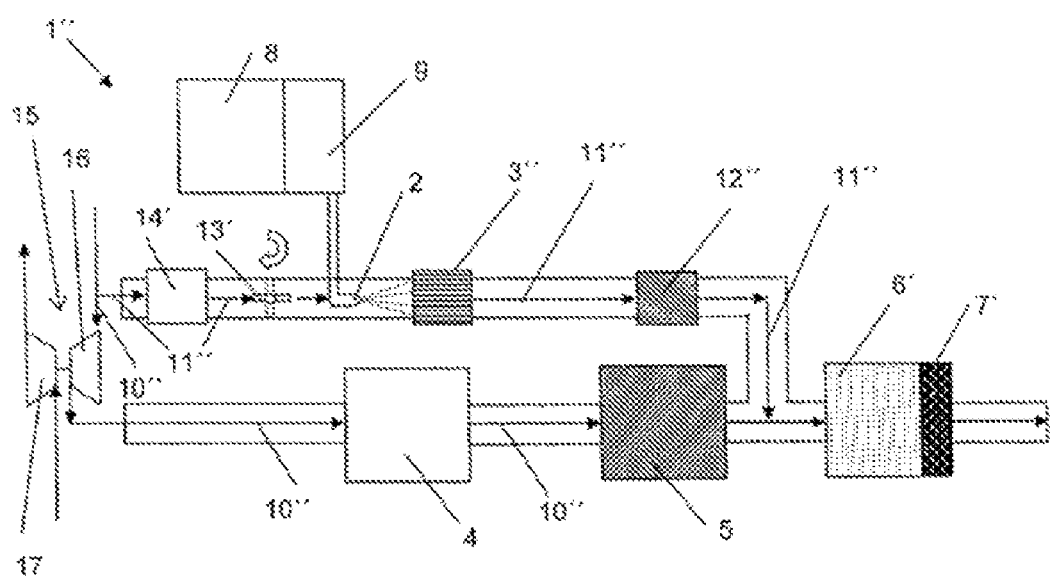
FIG. 3 shows an exhaust gas post treatment system for internal combustion engines having turbochargers.

Referring now to the drawings in detail, an arrangement for the selective catalytic reduction and for the reduction of solid particles in the exhaust gas of an internal combustion engine is schematically illustrated in FIG. 1. The exhaust gases, which are produced from an internal combustion engine (not illustrated) by the combustion processes, and which are symbolized by the arrows in FIGS. 1 to 3, are first guided over an oxidation catalytic converter 4, the purpose of which, pursuant to the reaction previously identified by (2), is to oxidize a portion of the nitric oxide contained in the exhaust gas to nitrogen dioxide by means of the excess oxygen present in the exhaust gas. The thus-produced nitrogen dioxide is used on the one hand during the reduction of the solid particles, and on the other hand with the subsequent SCR reaction, as will be described in greater detail subsequently.

A partial exhaust gas stream 11 branches off from the exhaust gas stream 10 downstream of the oxidation catalytic converter 4; a reduction agent is added to the hot exhaust gas in the partial exhaust gas stream 11 as close to the engine as possible. As is common with motor vehicles having SCR catalytic converters, the reduction agent is an aqueous urea solution; it is, of course, also conceivable to add urea in solid form, as this is already described in detail in the pertinent technical literature. The metering or dosing is effected as a function of the operating parameters of the internal combustion engine controlled by an engine control unit (not illustrated) in such a way that via a nozzle 2, the aqueous urea solution is sprayed into the exhaust gas stream directly upstream of a hydrolysis catalytic converter 3. The purpose of the hydrolysis catalytic converter 3 is to convert the aqueous urea solution as completely as possible into ammonia and water vapor, while avoiding byproducts. Under certain conditions, this release can also be adequately effected without a hydrolysis catalytic converter, so that the latter can then be dispensed with.

Disposed in the exhaust gas stream 10, downstream of the oxidation catalytic converter 4, is a first particle separator 5, and in the partial exhaust gas stream 11, downstream of the hydrolysis catalytic converter 3, is a second particle separator 12. The carbon particles carried along in the exhaust gas stream 10 or in the partial exhaust gas stream 11 are accumulated in the particle separators 5, 12 and are continuously converted into carbon monoxide, carbon dioxide, nitrogen and nitric oxide by the nitrogen dioxide produced upstream with the aid of the oxidation catalytic converter 4, thus eliminating the need for expensive regeneration cycles for the particle separators 5, 12.

The actual selective catalytic reduction of the nitrogen oxides is effected downstream to the first particle separator and to the second particle separator 12, after the return of the partial exhaust gas stream 11 to the exhaust gas stream 10, by the SCR catalytic converter 6, which is disposed downstream of the return location. The SCR catalytic converter 6 is intended to convert as great a portion of the nitrogen oxides ($NO_x$) present in the exhaust gas as possible, with a simultaneously high selectivity of the reduction according to equations (1) or (3), into nitrogen and water vapor without excess ammonia ($NH_3$) remaining in the exhaust gas stream. With the indicated SCR reduction, the residual nitrogen dioxide possibly still present in the exhaust gas stream is more reactive than is the remaining NO in the exhaust gas, so that it is desirable to design the oxidation catalytic converter 4 in such a way that as great a proportion of nitric oxide as possible is converted into nitrogen dioxide, in other words, more than is required for the conversion of the carbon particles in the particle separators 5, 12, or to coat the first particle filter 5 with a catalyst material that effects the conversion of additional NO contained in the exhaust gas stream into $NO_2$.

Due to the highly exothermic carbon oxidation in the particle filters 5, 12, a significant temperature increase can occur, so that downstream of the particle separators temperatures above 650° C. can occur that lead to damage of $V_2O_5$-containing SCR catalytic converters. For this reason, the use of SCR catalytic converters that are free of $V_2O_5$, which are generally based on iron, cobalt or copper zeolite material, can be expedient.

In view of the constantly changing operating conditions of an internal combustion engine that operates in a motor vehicle, it is obvious that the desired, as high as possible, conversion rates of nitrogen oxides can reliably take place only if a small ammonia excess is accepted. In order in situations of insufficient conversion to prevent toxic ammonia from being given off to the atmospheric air along with the partially cleaned exhaust gas, disposed downstream of the SCR catalytic converter 6 is an $NH_3$-oxidation catalytic converter 7, via which the excess $NH_3$ is converted into nitrogen and water vapor. This oxidation reaction should take place as selectively as possible, so that at least portions of iridium or iridium oxide should be used as active material for the $NH_3$-oxidation catalytic converter 7. However, if a higher conversion with less selectivity is desired platinum and/or palladium and/or oxides thereof can be used.

As already mentioned previously, if the temperature level at the supply location for the reduction agent is high over the entire operating range, the hydrolysis catalytic converter 3 can be dispensed with. Furthermore, as an alternative to the example in FIG. 1, in place of the particle separator a particle filter can be used, wherein the difference between particle separators and particle filters was already discussed. The interchangeability of particle separators and particle filters is also applicable for the examples that will be described subsequently, even if no explicit mention is made thereof.

By disposing a respective particle separator both in the exhaust gas stream and in the partial exhaust gas stream, and by again joining the exhaust gas streams together downstream of the two particle separators, the possibility is provided of coating the particle separator in the exhaust gas stream that has the larger quantity of exhaust gas flowing therethrough with a catalyst material that converts NO by oxidation into $NO_2$ without thereby influencing the preparation of the reduction agent in the partial exhaust gas stream. The additional $NO_2$ recovered by the coating significantly facilitates the subsequent SCR reaction, so that the overall conversion to $NO_x$ is considerably improved. This advantage is also applicable to the examples that are to be described subsequently.

FIG. 2 shows a further embodiment for the inventive exhaust gas post treatment system. Since this embodiment differs partially from the embodiment of FIG. 1 only in the partial exhaust gas stream, only the different parts will be described subsequently, and with regard to the same parts reference is made to the detailed description of the embodiment of FIG. 1.

Upstream of the oxidation catalytic converter 4, which is disposed in the exhaust gas stream 10' and which oxidizes the nitric oxide to nitrogen dioxide, a partial exhaust gas stream 11' branches off from the exhaust gas stream 10' and is guided over a shutoff device 13 that can be controlled by an engine control unit (not illustrated) as a function of operating parameters of the internal combustion engine, The purpose of the shutoff device 13 on the one hand is to control volume flow and exhaust gas quantity in the partial exhaust gas stream 11' as a function of the operating state of the internal combustion engine, and on the other hand at certain operating conditions, for example during engine braking operation of an internal combustion engine installed in a commercial vehicle, is to prevent exhaust gases laden with ammonia from flowing back in the direction of the engine. Disposed downstream of the shutoff device 13 is a further oxidation catalytic converter 14 for the conversion of at least a portion of the nitric oxide carried along in the partial exhaust gas stream 11' to nitrogen dioxide. Following the further oxidation catalytic converter 14, as viewed in the direction of flow in the exhaust gas, is a metering device 9 for the reduction agent that is identical to that described in FIG. 1. To avoid repetition, reference is made to the pertaining description of FIG. 1.

Again disposed downstream of the supply location of the reduction agent is a hydrolysis catalytic converter 3, that ensures the release of ammonia from the reduction agent, even under unfavorable temperature conditions. Disposed downstream of the hydrolysis converter 3', in the partial exhaust gas stream 11', is again a particle separator 12', downstream of which is the return location of the partial exhaust gas stream 11' into the exhaust gas stream 100. Downstream of the return location, the exhaust gas stream 10' is supplied to the SCR catalytic converter 6 and the NH$_3$-oxidation catalytic converter 7, the functions of which were already described in detail in conjunction with the embodiment of FIG. 1. For this purpose, reference is made to the description of FIG. 1.

In addition to the advantage already described with regard to the embodiment of FIG. 1, with the embodiment of FIG. 2, due to the further oxidation catalytic converter 14 that is provided, there is additionally the possibility of optimizing the secondary or partial exhaust gas stream 11' to the preparation of the reduction agent by the selection of the catalyst material. Furthermore, in appropriate situations, the oxidation catalytic converter 4 in the exhaust gas stream 10' can be formed entirely by coating the particle separator 5 with appropriately active catalyst material, which optimizes the space requirement and cost.

With internal combustion engines operated in commercial vehicles these days, an at least single-stage supercharger arrangement is customarily present, which with the aid of the exhaust gas contained in the exhaust gas stream compresses the combustion air supply to the internal combustion engine. For the exhaust gas post treatment, this causes problems because the exhaust gas that flows over the turbines of the exhaust gas turbocharger or turbochargers is inherently significantly cooled off by them. An exhaust gas stream that is cooled off in this manner, in particular during start-up operation and in the lower partial load range, is not in a position to achieve adequate exhaust gas temperatures for the hydrolysis of the reduction agent. Even if hydrolysis catalytic converters are used, the temperature level is generally not adequate. The arrangement of FIG. 3 provides a remedy for this problem. As shown there, the exhaust gas stream coming from the internal combustion engine (not illustrated) is already branched off upstream of the turbine 16 of the exhaust gas turbocharger 15 into an exhaust gas stream 10", which is guided over the turbine 16 and by means of this turbine drives the compressor 17, and into a partial exhaust gas stream 11". The partial exhaust gas stream 11" is guided over an oxidation catalytic converter 14', which in turn, in the normal direction of flow of the exhaust gas indicated by the arrows, converts nitric oxide into nitrogen dioxide, and on the other hand, for example under engine braking operation, oxidizes ammonia or not yet converted reduction agent that might possibly flow back with the exhaust gas stream in the direction toward the internal combustion engine. Disposed downstream of the oxidation catalytic converter 14' in the partial exhaust gas stream 11' is a shutoff device 13' which corresponds in construction and function to the shutoff device described in conjunction with FIG. 2, so that for this purpose reference is made to the detailed description of FIG. 2. Disposed downstream of the shutoff device 13' the reduction agent is supplied to the secondary or partial exhaust gas stream 11" by a metering device 9 for the reduction agent, as already described in FIG. 1. By means of the relatively high temperature that exists in the partial exhaust gas stream, and the hydrolysis catalytic converter 3" disposed downstream of the supply location, the reduction agent releases ammonia without the production of problematic reaction products, such as cyanuric acid. Parallel to the partial exhaust gas stream 11", the exhaust gas stream 10' is guided over an oxidation catalytic converter 4' which oxidizes at least a portion of the nitric oxide contained in the exhaust gas to nitrogen dioxide. A first particle filter 5 is disposed downstream of the oxidation catalytic converter or in the exhaust gas stream 10'. In the partial exhaust gas stream 11", a second particle filter 12" follows the hydrolysis catalytic converter 3". Downstream of the first particle filter 5 in the exhaust gas stream 10", and of the second particle filter 12" in the partial exhaust gas stream 11", the exhaust gas streams that are guided parallel to one another are rejoined and flow through the downstream SCR catalytic convener 6', which by way of selective catalytic reduction converts the nitrogen oxides present in the exhaust gas into nitrogen and water vapor. To prevent ammonia slippage, a downstream portion of the SCR catalytic converter 6 is coated with an active material that forms an NH$_3$-oxidation catalytic converter 7'.

If, as an alternative to the embodiment of FIG. 3, the turbine 16 is a double-low turbine, whereby one channel is supplied with exhaust gas from at least one first cylinder, and the other channel is supplied with exhaust gas from at least one second cylinder, it is advantageous to branch the partial exhaust gas stream off from one of the two channels. The cylinders of the channel from which a partial exhaust gas stream is branched off can then be operated with other engine parameters (e.g. fuel injection times or quantities) than are the cylinders of the other channel, so that it is advantageously possible to optimize the conditions in the partial exhaust gas stream with regard to the preparation of the reduction agent by, for example, raising the exhaust gas temperature in the start-up phase or in the low load range, for example by a secondary injection in the expansion or exhaust stroke.

With internal combustion engines having two exhaust gas turbochargers where customarily the turbines of one of the turbochargers is supplied with exhaust gas from a first bank of cylinders of the internal combustion engine, and the turbines of the other turbocharger are supplied with exhaust gas from a second bank of cylinders of the internal combustion engine, it is advantageous to branch the partial exhaust gas stream from the exhaust gas stream upstream of the turbine of one of the two exhaust gas turbochargers. The cylinders of the bank of cylinders, from the exhaust gas section of which the partial exhaust gas stream is branched off, can then be operated with other engine parameters (e.g. fuel injection times or quantities), than are the cylinders of the other bank of cylinders, so that here also it is advantageously possible to optimize the conditions in the partial exhaust gas stream with regard to the preparation of the reduction agent by, for example, raising the exhaust gas temperature in the start-up phase or in the low load range, for example by a secondary injection in the expansion of exhaust stroke.

With regard to the catalytic converters mentioned in the preceding examples, it is noted that they can be complete catalytic converters and/or coated catalytic converters, whereby the active components of the catalytic converters can be applied to ceramic and/or metallic and/or silica-containing and/or quartz-containing substrates. Such catalytic converters can be produced with the aid of many known manufacturing processes, for which purpose reference is made to the detailed technical literature.

It can additionally be expedient to accommodate a plurality of catalytic converters and/or particle separators in a common housing to save installation space and to reduce cost.

Since with the use of particle filters the filters can clog with oil ash, it is expedient to construct the filters in such a way that they can be exchanged or removed and easily cleaned.

To be able to operate the exhaust gas post treatment system in its optimum operating range, the exhaust gas temperature and/or the content of nitrogen dioxide at the devices for the separation of particles can be varied by adjusting engine parameters and/or by raising the hydrocarbon concentration with the aid of an adjustment of engine parameters, such as the fuel injection times or quantities, and/or by supplying hydrocarbons to the exhaust gas stream upstream of the catalytic converters for the oxidation of nitric oxide, which simultaneously effect the oxidation of hydrocarbons and/or nitric oxide.

The previously described embodiments can, of course, be realized in many ways by one of skill in the art without straying from the basic inventive concept; thus, the embodiments described are provided by way of example only.

The specification incorporates by reference the disclosure of German priority document 10 2006 38 291.9 filed Aug. 16, 2006.

The present invention is, of course, in no way restricted to the specific disclosure of the specification and drawings, but also encompasses any modifications within the scope of the appended claims.

What we claim is:

1. An exhaust gas post treatment system for nitrogen oxide and particle reduction of an internal combustion operated with excess air, comprising:
an oxidation catalytic converter disposed in the exhaust gas stream of the internal combustion engine for converting at least a portion of the nitric oxide contained in the exhaust gas stream into nitrogen dioxide;
a first particle separator or particle filter disposed in said exhaust gas stream downstream of said oxidation catalytic converter, wherein said first particle separator or particle filter is adapted to convert carbon particles accumulated in said first particle separator or particle filter into carbon monoxide, carbon dioxide, nitrogen and nitric oxide with the aid of nitrogen dioxide contained in said exhaust gas stream, and wherein said oxidation catalytic converter and said first particle separator or particle filter form a single component such that said first particle separator or particle filter is at least partially coated or impregnated with an active component that forms said oxidation catalytic converter;
wherein a partial exhaust gas stream is branched off from said exhaust gas stream upstream of said first particle separator or particle filter;
a supply tank for a reduction agent;
a metering device for receiving a reduction agent from the supply tank and for adding the reduction agent to said partial exhaust gas stream at a supply location, wherein the reduction agent is ammonia or a material that is adapted to release ammonia downstream of the supply location as a result of the hot exhaust gas;
a second particle separator or particle filter disposed in said partial exhaust gas stream downstream of the supply location for the reduction agent;
wherein downstream of said second particle separator or particle filter and downstream of said first particle separator or particle filter said partial exhaust gas stream is returned to said exhaust gas stream at a return location; and
an SCR catalytic converter disposed downstream of said return location for reducing nitrogen oxides contained in said exhaust gas stream to nitrogen and water vapor with the aid of ammonia or released ammonia by way of selective catalytic reduction.

2. An exhaust gas post treatment system according to claim 1, wherein to improve release of ammonia a hydrolysis catalytic converter is disposed in said partial exhaust gas stream downstream of said supply location for the reduction agent and upstream of said second particle separator or particle filter.

3. An exhaust gas post treatment system according to claim 2, wherein said hydrolysis catalytic converter and said second particle separator or particle filter are combined in a single component such that said second particle separator or particle filter is at least partially coated or impregnated with an active component that forms said hydrolysis catalytic converter.

4. An exhaust gas post treatment system according to claim 1, wherein said partial exhaust gas stream is branched off from said exhaust gas stream upstream of said oxidation catalytic converter, and wherein downstream of where said partial exhaust gas stream branches off a further oxidation catalytic converter is disposed in said partial exhaust gas stream for converting at least a portion of nitric oxide contained in said partial exhaust gas stream into nitrogen dioxide.

5. An exhaust gas post treatment system according to claim 1, wherein a flow-control element is disposed in said partial exhaust gas stream for controlling or regulating a volume velocity and/or quantity of the exhaust gas.

6. An exhaust gas post treatment system according to claim 1, wherein upstream of the supply location for the reduction agent, either a check valve is disposed in the partial exhaust gas stream or a controllable or regulatable shutoff element is disposed in said partial exhaust gas stream.

7. An exhaust gas post treatment system according to claim 1, wherein an $NH_3$-oxidation catalytic converter is disposed downstream of said SCR catalytic converter.

8. An exhaust gas post treatment system according to claim 7, wherein at least one of the materials selected from the group consisting of platinum, palladium, iridium, oxides thereof, IrTiOx and zeolites is used as active components for said oxidation catalytic converters for the conversion of nitric oxide into nitrogen dioxide and/or for said NH$_3$-oxidation catalytic converter for the oxidation of ammonia.

9. An exhaust gas post treatment system according to claim 1, wherein said SCR catalytic converter for the reduction of nitric oxide with the aid of ammonia contains at least one of the materials selected from the group consisting of vanadium, vanadium pentoxide, titanium dioxide, tungsten oxide, copper-containing zeolite, iron-containing zeolite, and cobalt-containing zeolite as active component.

10. An exhaust gas post treatment system according to claim 2, wherein for release of ammonia said hydrolysis catalytic converter contains at least one of the materials selected from the group consisting of titanium dioxide, silicon dioxide, aluminum oxide, and zeolites as active components.

11. An exhaust gas post treatment system according to claim 4, wherein active components of said oxidation catalytic converter and of said further oxidation catalytic converter are different and are respectively optimized to subsequent chemical reactions.

12. An exhaust gas post treatment system according to claim 1, wherein an exhaust gas temperature and/or a content of nitrogen dioxide at said particle separators or particle filters is adapted to be varied by adjustment of engine parameters and/or by raising hydrocarbon concentration with the aid of an adjustment of engine parameters and/or by a supply of hydrocarbons to the exhaust gas stream upstream of said oxidation catalytic converters for the oxidation of nitric oxide.

13. An exhaust gas post treatment system according to claim 1, wherein a plurality of catalytic converters and/or particle separators or filters are accommodated in a common housing.

14. An exhaust gas post treatment system according to claim 1, wherein said particle separators or particle filters are constructed in such a way that they are adapted to be exchanged or removed.

15. An exhaust gas post treatment system for nitrogen oxide and particle reduction of an internal combustion operated with excess air, comprising:
   an oxidation catalytic converter disposed in the exhaust gas stream of the internal combustion engine for converting at least a portion of the nitric oxide contained in the exhaust gas stream into nitrogen dioxide;
   a first particle separator or particle filter disposed in said exhaust gas stream downstream of said oxidation catalytic converter, wherein said first particle separator or particle filter is adapted to convert carbon particles accumulated in said first particle separator or particle filter into carbon monoxide, carbon dioxide, nitrogen and nitric oxide with the aid of nitrogen dioxide contained in said exhaust gas stream, and wherein said oxidation catalytic converter and said first particle separator or particle filter form a single component such that said first particle separator or particle filter is at least partially coated or impregnated with an active component that forms said oxidation catalytic converter;
   wherein a partial exhaust gas stream is branched off from said exhaust gas stream upstream of said first particle separator or particle filter;
   a supply tank for a reduction agent;
   a metering device for receiving a reduction agent from the supply tank and for adding the reduction agent to said partial exhaust gas stream at a supply location, wherein the reduction agent is ammonia or a material that is adapted to release ammonia downstream of the supply location as a result of the hot exhaust gas;
   a second particle separator or particle filter disposed in said partial exhaust gas stream downstream of the supply location for the reduction agent;
   wherein downstream of said second particle separator or particle filter and downstream of said first particle separator or particle filter said partial exhaust gas stream is returned to said exhaust gas stream at a return location; and
   an SCR catalytic converter disposed downstream of said return location for reducing nitrogen oxides contained in said exhaust gas stream to nitrogen and water vapor with the aid of ammonia or released ammonia by way of selective catalytic reduction;
   wherein at least one turbine of at least one exhaust gas turbocharger is disposed upstream of said oxidation catalytic converter (4), and wherein said partial exhaust gas stream, into which the reduction agent is supplied, is branched off from the exhaust gas stream upstream of said turbine of said exhaust gas turbocharger.

16. An exhaust gas post treatment system according to claim 15, wherein said turbine is a double-flow turbine, further wherein one channel thereof is supplied with exhaust gas from at least one first cylinder of the engine and the other channel thereof is supplied with exhaust gas from at least one second cylinder of the engine, and wherein said partial exhaust gas stream is branched off from one of the two channels.

17. An exhaust gas post treatment system according to claim 16, wherein the cylinders of the channel from which said partial exhaust gas stream is branched off is adapted to be operated with other engine parameters than are the cylinders of the other channel.

18. An exhaust gas post treatment system according to claim 15, wherein two exhaust gas turbochargers are provided, further wherein the turbine of one of said turbochargers is supplied with exhaust gas from a first bank of cylinders of the internal combustion engine and the turbine of the other turbocharger is supplied with exhaust gas from a second bank of cylinders of the internal combustion engine, and wherein said partial exhaust gas stream is branched off from the exhaust gas stream upstream of the turbine of one of said two exhaust gas turbochargers.

19. An exhaust gas post treatment system according to claim 18, wherein the bank of cylinders, from the exhaust gas section of which said partial exhaust gas stream branches off, is adapted to be operated with other engine parameters than is the other bank of cylinders.

20. An exhaust gas post treatment system according to claim 15, wherein a flow-control element is disposed in said partial exhaust gas stream for controlling or regulating a volume velocity and/or quantity of the exhaust gas.

21. An exhaust gas post treatment system according to claim 15, wherein upstream of the supply location for the reduction agent, either a check valve is disposed in the partial exhaust gas stream or a controllable or regulatable shutoff element is disposed in said partial exhaust gas stream.

22. An exhaust gas post treatment system according to claim 15, wherein said SCR catalytic converter for the reduction of nitric oxide with the aid of ammonia contains at least one of the materials selected from the group consisting of vanadium, vanadium pentoxide, titanium dioxide, tungsten oxide, copper-containing zeolite, iron-containing zeolite, and cobalt-containing zeolite as active component.

23. An exhaust gas post treatment system according to claim 15, wherein an exhaust gas temperature and/or a content of nitrogen dioxide at said particle separators or particle filters is adapted to be varied by adjustment of engine parameters and/or by raising hydrocarbon concentration with the aid of an adjustment of engine parameters and/or by a supply of hydrocarbons to the exhaust gas stream upstream of said oxidation catalytic converters for the oxidation of nitric oxide.

24. An exhaust gas post treatment system according to claim 15, wherein a plurality of catalytic converters and/or particle separators or filters are accommodated in a common housing.

25. An exhaust gas post treatment system according to claim 15, wherein said particle separators or particle filters are constructed in such a way that they are adapted to be exchanged or removed.

* * * * *